US012589744B2

(12) United States Patent
Fuess et al.

(10) Patent No.: US 12,589,744 B2
(45) Date of Patent: Mar. 31, 2026

(54) METHOD AND SYSTEM FOR ASSISTING A DRIVER OF A VEHICLE IN MAINTAINING A LANE

(71) Applicant: Bayerische Motoren Werke Aktiengesellschaft, Munich (DE)

(72) Inventors: Dominik Fuess, Munich (DE); Stephan Niermann, Hebertshausen (DE); Sebastian Zinser, Neufahrn bei Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 331 days.

(21) Appl. No.: 17/799,468

(22) PCT Filed: Dec. 14, 2020

(86) PCT No.: PCT/EP2020/085976
§ 371 (c)(1),
(2) Date: Aug. 12, 2022

(87) PCT Pub. No.: WO2021/160320
PCT Pub. Date: Aug. 19, 2021

(65) Prior Publication Data
US 2023/0339463 A1 Oct. 26, 2023

(30) Foreign Application Priority Data

Feb. 14, 2020 (DE) ..................... 10 2020 103 972.7

(51) Int. Cl.
*B60W 30/12* (2020.01)
*B60W 40/08* (2012.01)
(52) U.S. Cl.
CPC ............ *B60W 30/12* (2013.01); *B60W 40/08* (2013.01); *B60W 2540/229* (2020.02)

(58) Field of Classification Search
CPC ................. B60W 30/12; B60W 40/08; B60W 2540/229; G08G 1/167; B62D 15/025
See application file for complete search history.

(56) References Cited

U.S. PATENT DOCUMENTS

| | | | |
|---|---|---|---|
| 9,278,712 | B2 | 3/2016 | Buerkle et al. |
| 10,766,532 | B2 | 9/2020 | Pahlke et al. |

(Continued)

FOREIGN PATENT DOCUMENTS

| | | |
|---|---|---|
| CN | 101036066 A | 9/2007 |
| CN | 102963359 A | 3/2013 |

(Continued)

OTHER PUBLICATIONS

Chinese Office Action issued in Chinese application No. 202080096360.X dated May 27, 2023, with English translation (Sixteen (16) pages).

(Continued)

*Primary Examiner* — Jason Holloway
(74) *Attorney, Agent, or Firm* — Crowell & Moring LLP

(57) ABSTRACT

A method for assisting a driver of a vehicle in maintaining a lane includes: detecting driving state measurement signals of a vehicle; ascertaining a driving trajectory of the vehicle based on the detected driving state measurement signals; detecting surroundings information signals of the vehicle; ascertaining a lane trajectory of the lane based on the surroundings information signals; ascertaining points of intersection of the ascertained driving trajectory with the ascertained lane trajectory; determining, based on the ascertained points of intersection, whether a lane return situation is present in connection with a determined a lane departure situation; and emitting a signal to effectuate an assistance of the driver in maintaining the lane based on the determination.

9 Claims, 3 Drawing Sheets

(56) References Cited

U.S. PATENT DOCUMENTS

| 2008/0024284 A1 | 1/2008 | Baratoff et al. |
| 2013/0063595 A1* | 3/2013 | Niem .............. B60W 30/18145 |
| | | 348/148 |

FOREIGN PATENT DOCUMENTS

| CN | 105711588 A | 6/2016 |
| CN | 108454625 A | 8/2018 |
| DE | 10 2005 022 663 A1 | 11/2006 |
| DE | 10 2006 000 638 A1 | 7/2007 |
| DE | 10 2009 047 476 A1 | 6/2011 |
| DE | 10 2010 002 067 A1 | 8/2011 |
| DE | 10 2014 215 959 A1 | 5/2015 |
| DE | 10 2017 217 091 A1 | 3/2019 |
| EP | 1 422 111 A2 | 5/2004 |
| EP | 2 565 106 A1 | 3/2013 |

OTHER PUBLICATIONS

PCT/EP2020/085976, International Search Report dated Mar. 29, 2021 (Two (2) pages).
German Search Report issued in German application No. 10 2020 103 972.7 dated Aug. 13, 2020, with Statement of Relevancy (Seven (7) pages).

* cited by examiner

METHOD AND SYSTEM FOR ASSISTING A DRIVER OF A VEHICLE IN MAINTAINING A LANE

BACKGROUND AND SUMMARY OF THE INVENTION

The present invention relates to a method and a correspondingly designed system for assisting a driver of a vehicle in maintaining a lane.

So-called lane departure warning systems for vehicles are known from the prior art, which perform a warning and/or a steering intervention upon recognizing a lane departure situation. Such warnings and/or steering interventions are often perceived as inappropriate by the customer, in particular if the warning or intervention in the steering takes place very early. In advantageous refinements of such systems, it can be provided that in a special mode of the system, the warning or the intervention is suppressed. A suppression can take place, for example, if it is recognized that the driver actively steers, steps on the gas, or brakes.

It is the object of the present invention to disclose an improved solution with regard to the consideration of the needs of the driver for assisting a driver of a vehicle in maintaining a lane.

This object is achieved according to the invention by a method and by a system having the features according to the independent claims. Advantageous refinements of the present invention are specified in the dependent claims.

The invention is based on the concept of suppressing a lane departure warning upon recognizing an intended trajectory shortening (for example, cutting curves). For this purpose, a method for assisting a driver of a vehicle in maintaining a lane is provided, wherein the method comprises the following steps:

detecting driving state measurement signals of a vehicle, ascertaining a driving trajectory of the vehicle based on the detected driving state measurement signals, detecting surroundings information signals of the vehicle, ascertaining a lane trajectory of that lane on which the vehicle is moving based on the surroundings information signals, ascertaining points of intersection of the driving trajectory with the lane trajectory, determining whether a lane departure situation and possibly in addition a lane return situation is present, based on the ascertained points of intersection, emitting a signal to effectuate an assistance (warning/intervention) of the driver in maintaining the lane based on the determination of whether a lane departure situation and possibly in addition a lane return situation is present.

The driving state measurement signals can be signals from which items of information about the driving trajectory of the vehicle can be ascertained directly or by corresponding processing. In particular, signals which supply information about the longitudinal and/or lateral movement, thus, for example, velocity and steering angle, can be detected and evaluated. Deriving items of information about possible future changes of the measurement signals from existing measurement signals is also conceivable.

The surroundings information signals of the vehicle are in particular signals from which items of information about the surroundings of the vehicle, in particular at least about the course of the lane or lane trajectory of that lane on which the vehicle is moving, can be ascertained directly or by corresponding processing. In particular, signals from surroundings cameras and/or existing map data and/or received car-to-X data—possibly in conjunction with current position data of the vehicle—can be detected and evaluated to be able to derive the presently traveled lane and its at least temporarily upcoming course therefrom.

The lane trajectory to be ascertained can also be a lane trajectory correlating with the lane trajectory. In one particularly advantageous embodiment, a trajectory bounding the current lane, in particular a lane bounding the lane in the direction of the curve interior boundary can be the lane trajectory. A trajectory band (for example around the center of the lane) can also be ascertained as the lane trajectory. Predetermined parameters or conditions, which are recognized at the intersection points of the lane trajectory with the driving trajectory in the later course of the method, can be designed differently in dependence on the design of the ascertained lane trajectory.

If both items of information about the (at least temporarily upcoming) course of the driving trajectory of the vehicle and the lane trajectory are provided, based on these items of information—advantageously at least in an upcoming section possibly defined with respect to time and/or location—possible points of intersection of the ascertained driving trajectory of the vehicle with the ascertained lane trajectory are ascertained. This ascertainment can take place continuously or only if specific conditions are present.

The following criteria can be taken into consideration as conditions:

curvature of the road or the ascertained lane trajectory exceeds (in a defined upcoming section defined with respect to time and/or location) a predetermined, possibly variable first curvature limiting value, i.e., a curve is located in the upcoming roadway course, a recognized, upcoming curve extends in a defined direction, for example, in that direction in which a further lane adjoins the ego lane, in particular a further lane having opposite or identical driving direction, curvature of the ascertained driving trajectory exceeds (in a defined upcoming section defined with respect to time and/or location) a predetermined, possibly variable second curvature limiting value, i.e. the vehicle steers, the curvature of the ascertained driving trajectory extends in a defined direction, for example, in that direction in which a further lane adjoins the ego lane, in particular a further lane having opposite or identical driving direction, the velocity of the ego vehicle exceeds a predetermined defined, possibly variable limiting velocity, it is a defined road type, or on a multilane road, the vehicle is not located on the innermost lane of the curve.

In a further method step, it is provided that based on the ascertained points of intersection of the ascertained driving trajectory and the ascertained lane trajectory, it is established whether a lane departure situation and possibly in addition a lane return situation is present. Based on the determination as to whether a lane departure situation and possibly in addition a lane return situation is present, a signal to effectuate an assistance (warning/intervention) of the driver in maintaining the lane is emitted or suppressed.

The signal to assist the driver can trigger either an acoustic, optical, and/or haptic warning and/or an intervention in the vehicle control (for example, longitudinal and/or lateral control).

With corresponding design of the method, an emission of the signal to effectuate an assistance of the driver in maintaining the lane can advantageously be effectuated if a lane departure situation is determined and a lane return situation is not. Alternatively or additionally it can be provided that an emission of the signal to effectuate an assistance of the driver in maintaining the lane is suppressed if a lane departure situation and a lane return situation are determined.

The presence of a lane departure situation and/or possibly a lane return situation is advantageously determined based on the number of the determined points of intersection (in particular in an upcoming section defined with respect to time and/or location).

If, for example (in particular in an upcoming section defined with respect to time and/or location), no point of intersection is ascertained or determined, it is to be presumed that a lane departure situation will not occur in the evaluated section.

As soon as at least one point of intersection (in particular in an upcoming section defined with respect to time and/or location) is determined and possibly further criteria are met, it is to be presumed that a lane departure situation will occur in the evaluated section. Depending on the design of the method, if further criteria have to be met, these can be checked for presence or absence in parallel or only after determining a (first) point of intersection.

To recognize situations in which the driver wishes to carry out an intended trajectory shortening (cutting curves), thus intentionally only departs from the lane briefly, in a further advantageous embodiment of the invention, a lane return situation is determined if either at least or precisely two points of intersection are ascertained (in particular in an upcoming section defined with respect to time and/or location), and possibly further criteria or conditions are met. If more than two points of intersection are ascertained, the method can be designed in a further advantageous embodiment at least initially to only take into consideration the detected first two points of intersection. Alternatively or additionally, the number of the points of intersection to be taken into consideration in the section to be evaluated can be predetermined in dependence on the course of the road (for example, single curve or S curve). Depending on the embodiment of the method, if further criteria or conditions have to be met, these can be checked in parallel or only after determining the at least or precisely two points of intersection for presence or absence.

A lane return situation is advantageously determined if at least/precisely two points of intersection have been determined and in addition at least one further condition is met. If at least one further criterion or one further condition has to be met, so that a lane return situation is recognized upon determining at least or precisely two points of intersection, in the context of the at least one further condition, an evaluation of at least one of the following parameters can advantageously take place:

distance or spacing with respect to time of two points of intersection in relation to one another, spatial/geometric spacing of two points of intersection in relation to one another, lateral spacing, in particular maximum lateral spacing of the driving trajectory and the lane trajectory between two points of intersection, distance or spacing with respect to time or spatial-geometric spacing of the vehicle to the first point of intersection, lane type of the presently traveled lane and/or lane to be traveled after crossing the first point of intersection, result of a driver attentiveness monitoring unit, and/or curvature of the lane trajectory.

Advantageously, for example, a lane return situation can be determined upon evaluation of a further parameter if at least or precisely two points of intersection are ascertained and in addition at least one of the following conditions is met:

the distance or spacing with respect to time of two points of intersection in relation to one another is less than a predetermined (constant or variable) time threshold, the spatial/geometric spacing of two points of intersection in relation to one another is less than a predetermined spacing threshold—possibly dependent on further parameters, the maximum lateral spacing of the driving trajectory and the lane trajectory between two points of intersection is less than a predetermined distance—possibly dependent on further parameters, the distance or spacing with respect to time or the spatial/geometric spacing of the vehicle to the first point of intersection is less than a predetermined distance threshold possibly dependent on further parameters—and/or the lane type of the presently traveled lane and/or the lane to be traveled after crossing the first point of intersection belongs to a predetermined group of defined permissible lane types.

A plausibility check with regard to the recognition of a deliberate trajectory shortening can be performed by the consideration of at least one or more further conditions.

In a further advantageous embodiment, for example, the steering torque applied by the driver, a gas pedal actuation, or the level of the effectuated drive torque and/or a brake pedal actuation or the level of the effectuated braking torque can also be taken into consideration. Thus, for example, the dimension of the maximum permissible spacing of the driving trajectory and the lane trajectory between two points of intersection (spacing threshold) and/or the maximum permissible distance or spacing with respect to time of two points of intersection in relation to one another (time threshold) and/or the maximum permissible spatial/geometric spacing of two points of intersection in relation to one another (spacing threshold) can be predetermined as a function of the applied steering torque and/or the actuation of the gas pedal (or the requested drive torque) or the brake pedal (or the requested braking torque). If, for example, a higher steering torque is detected, a "greater" deviation or a greater maximum permissible spacing of the driving trajectory and the lane trajectory can be permitted between two points of intersection, since it is to be presumed that a greater deviation is intended.

In a further advantageous embodiment of the invention, the method can comprise an evaluation of a result of a driver attentiveness monitoring unit. In particular, the evaluation can be taken into consideration in such a way that independently of the determination of whether a lane departure situation and possibly an additional lane return situation is present, a signal to effectuate an assistance of the driver in maintaining the lane is effectuated or a suppression of the assistance is suppressed (thus a warning is output) in spite of recognized lane departure situation and lane return situation, if the result of the driver attentiveness monitoring unit does not identify an attentive driver.

The method according to the invention can be carried out using a corresponding system. This system for assisting a driver of a vehicle in maintaining a lane comprises a first detection unit for detecting driving state measurement signals of a vehicle, a first ascertainment unit for ascertaining a driving trajectory of the vehicle based on the detected driving state measurement signals, a second detection unit for detecting surroundings information signals of the vehicle, a second ascertainment unit for ascertaining a lane trajectory of that lane on which the vehicle is moving based on the surroundings information signals, a third ascertainment unit for ascertaining points of intersection of the ascertained driving trajectory with the ascertained lane trajectory, a determination unit for determining whether a lane departure situation and possibly additionally a lane return situation is present, based on the ascertained points of intersection, and an emission unit for emitting a signal to effectuate an assistance of the driver in maintaining the lane based on the determination of whether a lane departure situation and possibly additionally a lane return situation is present.

The first and second detection unit, which can consist of multiple partial detection units, can be designed here to detect, possibly prepare, and/or process relevant signals, and output them to a first ascertainment unit. The two detection units can also be combined to form one detection unit.

Similarly to the detection units, the first, second, and possibly third ascertainment units can each consist of multiple partial ascertainment units or can be combined to form one ascertainment unit. The determination unit and emission unit can advantageously also be combined to form one unit.

The preferred embodiments presented with reference to the method according to the invention and the advantages thereof apply accordingly to the system according to the invention.

Further features of the invention result from the claims, the figures, and the description of the figures. The features and combinations of features mentioned above in the description and the features and combinations of features mentioned hereinafter in the description of the figures and/or shown solely in the figures are usable not only in the respective specified combination, but also in other combinations or alone, without leaving the scope of the invention.

The invention will be explained in more detail on the basis of preferred exemplary embodiments and with reference to the appended drawings.

BRIEF DESCRIPTION OF THE DRAWINGS

In the figures, identical or functionally identical elements are provided with the same reference signs.

DETAILED DESCRIPTION OF THE DRAWINGS

Figure 1:
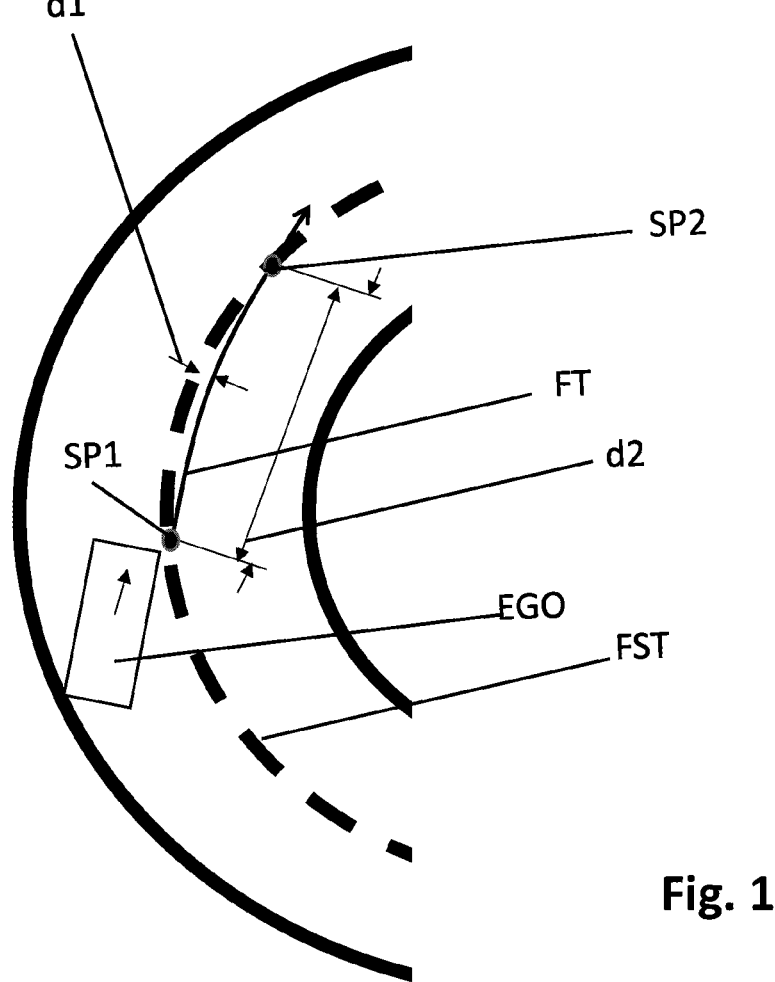
FIG. 1 schematically illustrates a traffic situation having an intentional trajectory shortening of the driver according to at least one embodiment.

FIG. 1 shows a curve situation of a two-lane road, on which a vehicle EGO travels along the driving trajectory FT into the curve on the left lane. The vehicle EGO traverses the lane trajectory FST, which is identical in this example to the lane boundary line, at the points of intersection SP1 and SP2. Based on the points of intersection SP1 and SP2, in particular the number of the points of intersection, their spacing d2 in relation to one another and possibly based on the maximum spacing d1 of the driving trajectory FT and the lane trajectory FST between the two points of intersection SP1 and SP2, it can be determined whether a lane departure situation and possibly a lane return situation exists in combination with a lane return situation which indicates an intentional trajectory shortening. It can be decided in dependence on this information whether a lane departure warning has to be output to the driver or an intervention into the longitudinal control has to take place, or whether a corresponding warning or an intervention is to be suppressed.

Figure 2:
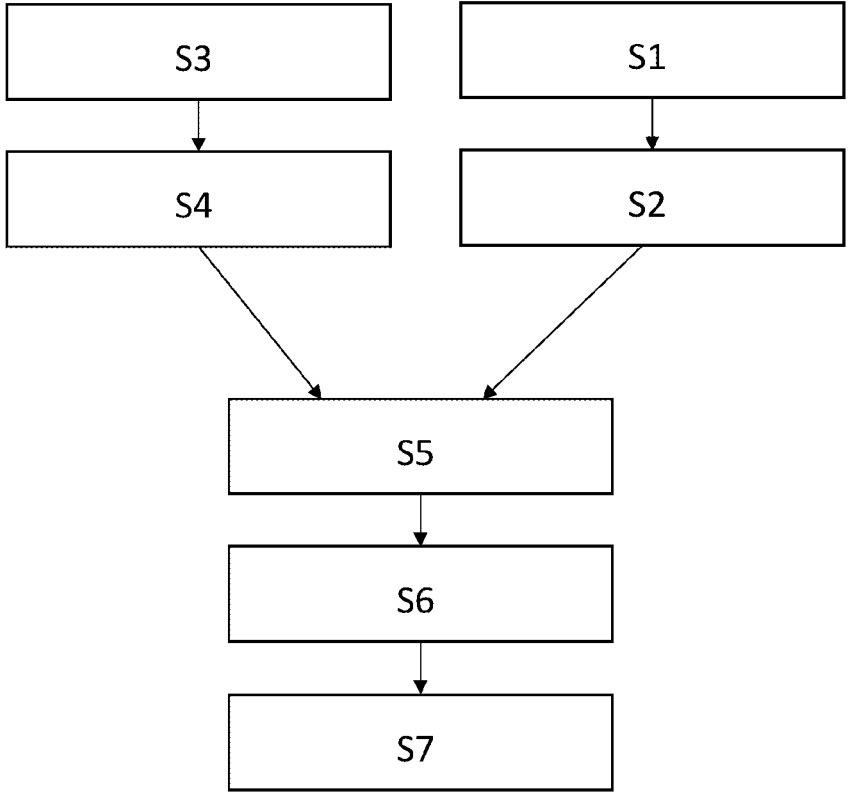
FIG. 2 illustrates a simplified schematic flow chart of a method according to at least one embodiment, and FIG. 3 schematically illustrates a simplified system according to at least one embodiment.

FIG. 2 shows a very simplified schematic flow chart of the method. A condition for carrying out the method is that a lane departure warning system is active and possibly additionally lane boundaries can be recognized.

The method begins in step S1 with the continuous detection of driving state measurement signals of a vehicle. The measurement signals can be, for example, signals which supply items of information about the longitudinal and lateral movement of the vehicle. A turn signal activity, which indicates a possible turning off process, could also be detected and evaluated later. These measurement signals can be received using sensors present in the vehicle and possibly already prepared appropriately. In a next step S2, a driving trajectory of the vehicle, which the vehicle is expected to take, is ascertained based on the detected driving state measurement signals and possibly further relevant items of information.

In parallel to steps S1 and S2, a detection of surroundings information signals of the vehicle takes place continuously in step S3. These signals can be detected, for example, by means of a camera system and/or from map data, which provide items of information about the course of the road. These surroundings information signals can either be ascertained directly in the vehicle using corresponding sensors, or transmitted from outside the vehicle to the vehicle via a car-to-X interface. In a next step S4, based on the detected surroundings information signals and possibly further relevant items of information, a lane trajectory of that lane on which the vehicle is moving is ascertained. The lane trajectory is ideally the lane boundary trajectory on the inside of the curve or a lane boundary trajectory offset to the lane boundary trajectory on the inside of the curve (by a defined spacing, which can be dependent on the vehicle width, for example). Alternatively, a lane trajectory band, which covers essentially the entire lane, can also be ascertained as the lane trajectory. If the lane trajectory located centrally in the lane is ascertained as the lane trajectory, the width of the lane additionally has to be ascertained as further information, since this information possibly has to be taken into consideration in the ascertainment of lane departure situations and/or lane return situations.

If the items of information on the driving trajectory and lane trajectory are present, in a next step S5, possible points of intersection of the ascertained driving trajectory with the lane trajectory are ascertained based on the ascertained driving trajectory and lane trajectory and possibly further items of information. In the next step S6, it is determined by evaluation of the ascertained points of intersection, in particular the number of the ascertained points of intersection and the location of the points of intersection in relation to one another, and further items of information (for example, maximum spacing of the driving trajectory from the lane trajectory between two ascertained points of intersection), whether a lane departure situation and/or a lane return situation are present or are to be expected.

Figure 3:
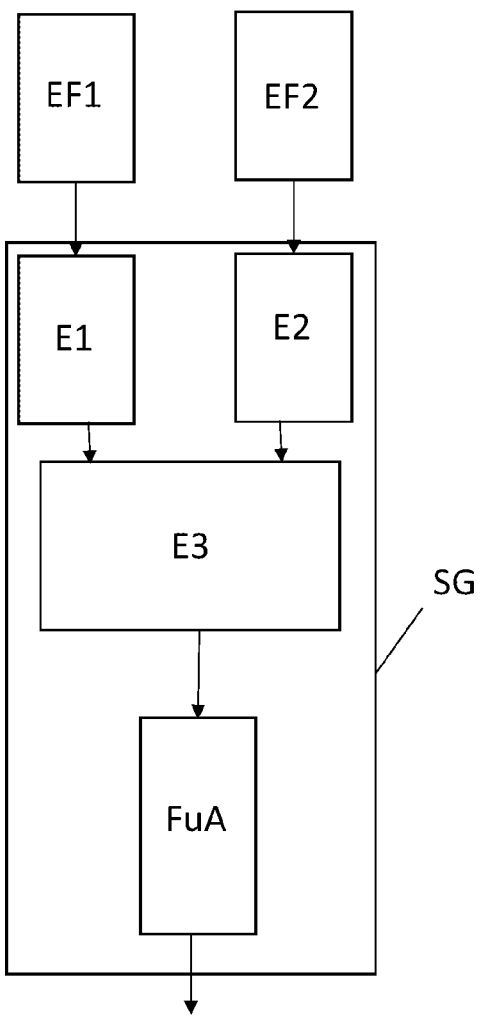

In dependence on this information, finally, in a step S7, a signal to effectuate an assistance (warning/intervention) of the driver in maintaining the lane is emitted, wherein an emission of the signal to effectuate an assistance of the driver in maintaining the lane is effectuated if a lane departure situation and no lane return situation is determined and an emission of the signal for effectuating an assistance of the driver in maintaining the lane is suppressed if a lane departure situation and a lane return situation are determined. FIG. 3 shows an exemplary, greatly simplified schematic illustration of a corresponding inventive system for assisting a driver of a vehicle in maintaining a lane. A first detection unit EF1 is configured to determine driving state measurement signals of a vehicle. A first ascertainment unit E1, integrated in a control unit SG, is configured to ascertain a driving trajectory of the vehicle based on the detected driving state measurement signals. A second detection unit EF2 is configured to detect surroundings information signals of the vehicle, wherein the second detection unit can also be designed to receive vehicle-external data. A second ascertainment unit E2, also integrated in the control unit SG, is configured to ascertain a lane trajectory of that lane on which the vehicle is moving, based on the surroundings information signals. A third ascertainment unit E3, also integrated in the control unit SG, is configured to ascertain points of intersection of the driving trajectory with the lane trajectory.

A combined determination and emission unit FuA, also integrated in the control unit SG, is configured to determine whether a lane departure situation and possibly in addition a lane return situation is present, based on the ascertained points of intersection. The combined determination and emission unit FuA is also configured to emit a signal to effectuate an assistance (warning/intervention) of the driver in maintaining the lane based on the determination of whether a lane departure situation and possibly additionally a lane return situation is present.

An embodiment of the system for carrying out additional method steps, including intervening steps that would be apparent to those of ordinary skill in the art, is not described in detail here but is also contemplated.

It is possible by way of the invention described here to recognize situations in a simple manner in which the driver performs a trajectory shortening by intentionally temporarily departing from the ego lane and suppressing unnecessary warnings or interventions in the vehicle control based on these items of information.

METHOD AND SYSTEM FOR ASSISTING A DRIVER OF A VEHICLE IN MAINTAINING A LANE

The present invention relates to a method and a correspondingly designed system for assisting a driver of a vehicle in maintaining a lane.

So-called lane departure warning systems for vehicles are known from the prior art, which perform a warning and/or a steering intervention upon recognizing a lane departure situation. Such warnings and/or steering interventions are often perceived as inappropriate by the customer, in particular if the warning or intervention in the steering takes place very early. In advantageous refinements of such systems, it can be provided that in a special mode of the system, the warning or the intervention is suppressed. A suppression can take place, for example, if it is recognized that the driver actively steers, steps on the gas, or brakes.

It is the object of the present invention to disclose an improved solution with regard to the consideration of the needs of the driver for assisting a driver of a vehicle in maintaining a lane.

This object is achieved according to the invention by a method and by a system having the features according to the independent claims. Advantageous refinements of the present invention are specified in the dependent claims.

The invention is based on the concept of suppressing a lane departure warning upon recognizing an intended trajectory shortening (for example, cutting curves). For this purpose, a method for assisting a driver of a vehicle in maintaining a lane is provided, wherein the method comprises the following steps:

detecting driving state measurement signals of a vehicle,
    ascertaining a driving trajectory of the vehicle based on the detected driving state measurement signals,
detecting surroundings information signals of the vehicle,
    ascertaining a lane trajectory of that lane on which the vehicle is moving based on the surroundings information signals,
ascertaining points of intersection of the driving trajectory with the lane trajectory,
determining whether a lane departure situation and possibly in addition a lane return situation is present, based on the ascertained points of intersection,
emitting a signal to effectuate an assistance (warning/intervention) of the driver in maintaining the lane based on the determination of whether a lane departure situation and possibly in addition a lane return situation is present.

The driving state measurement signals can be signals from which items of information about the driving trajectory of the vehicle can be ascertained directly or by corresponding processing. In particular, signals which supply information about the longitudinal and/or lateral movement, thus, for example, velocity and steering angle, can be detected and evaluated. Deriving items of information about possible future changes of the measurement signals from existing measurement signals is also conceivable.

The surroundings information signals of the vehicle are in particular signals from which items of information about the surroundings of the vehicle, in particular at least about the course of the lane or lane trajectory of that lane on which the vehicle is moving, can be ascertained directly or by corresponding processing. In particular, signals from surroundings cameras and/or existing map data and/or received car-to-X data—possibly in conjunction with current position data of the vehicle—can be detected and evaluated to be able to derive the presently traveled lane and its at least temporarily upcoming course therefrom.

The lane trajectory to be ascertained can also be a lane trajectory correlating with the lane trajectory. In one particularly advantageous embodiment, a trajectory bounding the current lane, in particular a lane bounding the lane in the direction of the curve interior boundary can be the lane trajectory. A trajectory band (for example around the center of the lane) can also be ascertained as the lane trajectory. Predetermined parameters or conditions, which are recognized at the intersection points of the lane trajectory with the driving trajectory in the later course of the method, can be designed differently in dependence on the design of the ascertained lane trajectory.

If both items of information about the (at least temporarily upcoming) course of the driving trajectory of the vehicle and the lane trajectory are provided, based on these items of information—advantageously at least in an upcoming section possibly defined with respect to time and/or location—possible points of intersection of the ascertained driving trajectory of the vehicle with the ascertained lane trajectory are ascertained. This ascertainment can take place continuously or only if specific conditions are present.

The following criteria can be taken into consideration as conditions:

curvature of the road or the ascertained lane trajectory exceeds (in a defined upcoming section defined with respect to time and/or location) a predetermined, possibly variable first curvature limiting value, i.e., a curve is located in the upcoming roadway course, a recognized, upcoming curve extends in a defined direction, for example, in that direction in which a further lane adjoins the ego lane, in particular a further lane having opposite or identical driving direction, curvature of the ascertained driving trajectory exceeds (in a defined upcoming section defined with respect to time and/or location) a predetermined, possibly variable second curvature limiting value, i.e. the vehicle steers, the curvature of the ascertained driving trajectory extends in a defined direction, for example, in that direction in which a further lane adjoins the ego lane, in particular a further lane having opposite or identical driving direction, the velocity of the ego vehicle exceeds a predetermined defined, possibly variable limiting velocity, it is a defined road type, or on a multilane road, the vehicle is not located on the innermost lane of the curve.

In a further method step, it is provided that based on the ascertained points of intersection of the ascertained driving trajectory and the ascertained lane trajectory, it is established whether a lane departure situation and possibly in addition a lane return situation is present. Based on the determination as to whether a lane departure situation and possibly in addition a lane return situation is present, a signal to effectuate an assistance (warning/intervention) of the driver in maintaining the lane is emitted or suppressed.

The signal to assist the driver can trigger either an acoustic, optical, and/or haptic warning and/or an intervention in the vehicle control (for example, longitudinal and/or lateral control).

With corresponding design of the method, an emission of the signal to effectuate an assistance of the driver in maintaining the lane can advantageously be effectuated if a lane departure situation is determined and a lane return situation is not. Alternatively or additionally it can be provided that an emission of the signal to effectuate an assistance of the driver in maintaining the lane is suppressed if a lane departure situation and a lane return situation are determined.

The presence of a lane departure situation and/or possibly a lane return situation is advantageously determined based on the number of the determined points of intersection (in particular in an upcoming section defined with respect to time and/or location).

If, for example (in particular in an upcoming section defined with respect to time and/or location), no point of intersection is ascertained or determined, it is to be presumed that a lane departure situation will not occur in the evaluated section.

As soon as at least one point of intersection (in particular in an upcoming section defined with respect to time and/or location) is determined and possibly further criteria are met, it is to be presumed that a lane departure situation will occur in the evaluated section. Depending on the design of the method, if further criteria have to be met, these can be checked for presence or absence in parallel or only after determining a (first) point of intersection.

To recognize situations in which the driver wishes to carry out an intended trajectory shortening (cutting curves), thus intentionally only departs from the lane briefly, in a further advantageous embodiment of the invention, a lane return situation is determined if either at least or precisely two points of intersection are ascertained (in particular in an upcoming section defined with respect to time and/or location), and possibly further criteria or conditions are met. If more than two points of intersection are ascertained, the method can be designed in a further advantageous embodiment at least initially to only take into consideration the detected first two points of intersection. Alternatively or additionally, the number of the points of intersection to be taken into consideration in the section to be evaluated can be predetermined in dependence on the course of the road (for example, single curve or S curve). Depending on the embodiment of the method, if further criteria or conditions have to be met, these can be checked in parallel or only after determining the at least or precisely two points of intersection for presence or absence.

A lane return situation is advantageously determined if at least/precisely two points of intersection have been determined and in addition at least one further condition is met. If at least one further criterion or one further condition has to be met, so that a lane return situation is recognized upon determining at least or precisely two points of intersection, in the context of the at least one further condition, an evaluation of at least one of the following parameters can advantageously take place:

distance or spacing with respect to time of two points of intersection in relation to one another, spatial/geometric spacing of two points of intersection in relation to one another, lateral spacing, in particular maximum lateral spacing of the driving trajectory and the lane trajectory between two points of intersection, distance or spacing with respect to time or spatial-geometric spacing of the vehicle to the first point of intersection, lane type of the presently traveled lane and/or lane to be traveled after crossing the first point of intersection, result of a driver attentiveness monitoring unit, and/or curvature of the lane trajectory.

Advantageously, for example, a lane return situation can be determined upon evaluation of a further parameter if at least or precisely two points of intersection are ascertained and in addition at least one of the following conditions is met:

the distance or spacing with respect to time of two points of intersection in relation to one another is less than a predetermined (constant or variable) time threshold, the spatial/geometric spacing of two points of intersection in relation to one another is less than a predetermined spacing threshold—possibly dependent on further parameters, the maximum lateral spacing of the driving trajectory and the lane trajectory between two points of intersection is less than a predetermined distance—possibly dependent on further parameters, the distance or spacing with respect to time or the spatial/geometric spacing of the vehicle to the first point of intersection is less than a predetermined distance threshold—possibly dependent on further parameters—and/or the lane type of the presently traveled lane and/or the lane to be traveled after crossing the first point of intersection belongs to a predetermined group of defined permissible lane types.

A plausibility check with regard to the recognition of a deliberate trajectory shortening can be performed by the consideration of at least one or more further conditions.

In a further advantageous embodiment, for example, the steering torque applied by the driver, a gas pedal actuation, or the level of the effectuated drive torque and/or a brake pedal actuation or the level of the effectuated braking torque can also be taken into consideration. Thus, for example, the dimension of the maximum permissible spacing of the driving trajectory and the lane trajectory between two points of intersection (spacing threshold) and/or the maximum permissible distance or spacing with respect to time of two points of intersection in relation to one another (time threshold) and/or the maximum permissible spatial/geometric spacing of two points of intersection in relation to one another (spacing threshold) can be predetermined as a function of the applied steering torque and/or the actuation of the gas pedal (or the requested drive torque) or the brake pedal (or the requested braking torque). If, for example, a higher steering torque is detected, a "greater" deviation or a greater maximum permissible spacing of the driving trajectory and the lane trajectory can be permitted between two points of intersection, since it is to be presumed that a greater deviation is intended.

In a further advantageous embodiment of the invention, the method can comprise an evaluation of a result of a driver attentiveness monitoring unit. In particular, the evaluation can be taken into consideration in such a way that independently of the determination of whether a lane departure situation and possibly an additional lane return situation is present, a signal to effectuate an assistance of the driver in maintaining the lane is effectuated or a suppression of the assistance is suppressed (thus a warning is output) in spite of recognized lane departure situation and lane return situation, if the result of the driver attentiveness monitoring unit does not identify an attentive driver.

The method according to the invention can be carried out using a corresponding system. This system for assisting a driver of a vehicle in maintaining a lane comprises
- a first detection unit for detecting driving state measurement signals of a vehicle,
- a first ascertainment unit for ascertaining a driving trajectory of the vehicle based on the detected driving state measurement signals,
- a second detection unit for detecting surroundings information signals of the vehicle,
- a second ascertainment unit for ascertaining a lane trajectory of that lane on which the vehicle is moving based on the surroundings information signals,
- a third ascertainment unit for ascertaining points of intersection of the ascertained driving trajectory with the ascertained lane trajectory,
- a determination unit for determining whether a lane departure situation and possibly additionally a lane return situation is present, based on the ascertained points of intersection, and
- an emission unit for emitting a signal to effectuate an assistance of the driver in maintaining the lane based on the determination of whether a lane departure situation and possibly additionally a lane return situation is present.

The first and second detection unit, which can consist of multiple partial detection units, can be designed here to detect, possibly prepare, and/or process relevant signals, and output them to a first ascertainment unit. The two detection units can also be combined to form one detection unit.

Similarly to the detection units, the first, second, and possibly third ascertainment units can each consist of multiple partial ascertainment units or can be combined to form one ascertainment unit. The determination unit and emission unit can advantageously also be combined to form one unit.

The preferred embodiments presented with reference to the method according to the invention and the advantages thereof apply accordingly to the system according to the invention.

Further features of the invention result from the claims, the figures, and the description of the figures. The features and combinations of features mentioned above in the description and the features and combinations of features mentioned hereinafter in the description of the figures and/or shown solely in the figures are usable not only in the respective specified combination, but also in other combinations or alone, without leaving the scope of the invention.

The invention will be explained in more detail on the basis of preferred exemplary embodiments and with reference to the appended drawings. In the figures:

FIG. 1 shows a traffic situation having an intentional trajectory shortening of the driver, FIG. 2 shows a greatly simplified schematic flow chart of the method, and FIG. 3 shows a greatly simplified schematic illustration of a corresponding system.

In the figures, identical or functionally identical elements are provided with the same reference signs.

FIG. 1 shows a curve situation of a two-lane road, on which a vehicle EGO travels along the driving trajectory FT into the curve on the left lane. The vehicle EGO traverses the lane trajectory FST, which is identical in this example to the lane boundary line, at the points of intersection SP1 and SP2. Based on the points of intersection SP1 and SP2, in particular the number of the points of intersection, their spacing d2 in relation to one another and possibly based on the maximum spacing d1 of the driving trajectory FT and the lane trajectory FST between the two points of intersection SP1 and SP2, it can be determined whether a lane departure situation and possibly a lane return situation exists in combination with a lane return situation which indicates an intentional trajectory shortening. It can be decided in dependence on this information whether a lane departure warning has to be output to the driver or an intervention into the longitudinal control has to take place, or whether a corresponding warning or an intervention is to be suppressed.

FIG. 2 shows a very simplified schematic flow chart of the method. A condition for carrying out the method is that a lane departure warning system is active and possibly additionally lane boundaries can be recognized.

The method begins in step S1 with the continuous detection of driving state measurement signals of a vehicle. The measurement signals can be, for example, signals which supply items of information about the longitudinal and lateral movement of the vehicle. A turn signal activity, which indicates a possible turning off process, could also be detected and evaluated later. These measurement signals can be received using sensors present in the vehicle and possibly already prepared appropriately. In a next step S2, a driving trajectory of the vehicle, which the vehicle is expected to take, is ascertained based on the detected driving state measurement signals and possibly further relevant items of information.

In parallel to steps S1 and S2, a detection of surroundings information signals of the vehicle takes place continuously in step S3. These signals can be detected, for example, by means of a camera system and/or from map data, which provide items of information about the course of the road. These surroundings information signals can either be ascertained directly in the vehicle using corresponding sensors, or transmitted from outside the vehicle to the vehicle via a car-to-X interface. In a next step S4, based on the detected surroundings information signals and possibly further relevant items of information, a lane trajectory of that lane on which the vehicle is moving is ascertained. The lane trajectory is ideally the lane boundary trajectory on the inside of the curve or a lane boundary trajectory offset to the lane boundary trajectory on the inside of the curve (by a defined spacing, which can be dependent on the vehicle width, for example). Alternatively, a lane trajectory band, which covers essentially the entire lane, can also be ascertained as the lane trajectory. If the lane trajectory located centrally in the lane is ascertained as the lane trajectory, the width of the lane additionally has to be ascertained as further information, since this information possibly has to be taken into consideration in the ascertainment of lane departure situations and/or lane return situations.

If the items of information on the driving trajectory and lane trajectory are present, in a next step S5, possible points of intersection of the ascertained driving trajectory with the lane trajectory are ascertained based on the ascertained driving trajectory and lane trajectory and possibly further items of information. In the next step S6, it is determined by evaluation of the ascertained points of intersection, in particular the number of the ascertained points of intersection and the location of the points of intersection in relation to one another, and further items of information (for example, maximum spacing of the driving trajectory from the lane trajectory between two ascertained points of intersection), whether a lane departure situation and/or a lane return situation are present or are to be expected.

In dependence on this information, finally, in a step S7, a signal to effectuate an assistance (warning/intervention) of the driver in maintaining the lane is emitted, wherein an emission of the signal to effectuate an assistance of the driver in maintaining the lane is effectuated if a lane departure situation and no lane return situation is determined and an emission of the signal for effectuating an assistance of the driver in maintaining the lane is suppressed if a lane departure situation and a lane return situation are determined.

FIG. 3 shows an exemplary, greatly simplified schematic illustration of a corresponding inventive system for assisting a driver of a vehicle in maintaining a lane. The system comprises here a first detection unit EF1 for detecting driving state measurement signals of a vehicle, a first ascertainment unit E1 integrated in a control unit SG for ascertaining a driving trajectory of the vehicle based on the detected driving state measurement signals, a second detection unit EF2 for detecting surroundings information signals of the vehicle, wherein the second detection unit can also be designed to receive vehicle-external data, a second ascertainment unit E2, also integrated in the control unit SG, for ascertaining a lane trajectory of that lane on which the vehicle is moving, based on the surroundings information signals, a third ascertainment unit E3, also integrated in the control unit SG, for ascertaining points of intersection of the driving trajectory with the lane trajectory, a combined determination and emission unit FuA, also integrated in the control unit SG, for determining whether a lane departure situation and possibly in addition a lane return situation is present, based on the ascertained points of intersection, and for emitting a signal to effectuate an assistance (warning/intervention) of the driver in maintaining the lane based on the determination of whether a lane departure situation and possibly additionally a lane return situation is present.

An embodiment of the system for carrying out all required method steps is not described in detail here but is also comprised.

It is possible by way of the invention described here to recognize situations in a simple manner in which the driver performs a trajectory shortening by intentionally temporarily departing from the ego lane and suppressing unnecessary warnings or interventions in the vehicle control based on these items of information.

The invention claimed is:

1. A method for assisting a driver of a vehicle in maintaining a lane, having the following steps:

detecting driving state measurement signals of a vehicle;

ascertaining a driving trajectory of the vehicle based on the detected driving state measurement signals;

detecting surroundings information signals of the vehicle;

ascertaining a lane trajectory of the lane based on the surroundings information signals;

ascertaining points of intersection of the ascertained driving trajectory with the ascertained lane trajectory;

determining, based on at least the number of ascertained points of intersection: (a) whether a lane departure situation is present, and (b) whether a lane return situation is also present;

emitting a signal to effectuate an assistance of the driver in maintaining the lane based on the determination.

2. The method of claim 1, wherein the signal is emitted the lane return situation is not present.

3. The method of claim 1, wherein emitting the signal is suppressed if a lane return situation is determined.

4. The method of claim 1, wherein the lane departure situation is determined if at least one point of intersection of the ascertained driving trajectory with the ascertained lane trajectory has been ascertained.

5. The method of claim 1, wherein the lane return situation is determined if at least two points of intersection of the ascertained driving trajectory with the ascertained lane trajectory have been ascertained.

6. The method of claim 5, wherein the lane return situation is determined if at least one further condition is met, wherein evaluating the at least one further condition includes evaluating at least one of:

distance with respect to time of two points of intersection in relation to one another;

spatial/geometric spacing of two points of intersection in relation to one another;

lateral spacing, in particular maximum lateral spacing of the driving trajectory and the lane trajectory between two points of intersection;

distance with respect to time or spatial/geometric spacing of the vehicle to the first point of intersection;

lane type of the presently travelled lane and/or the lane to be travelled after crossing the first point of intersection; and result of a driver attentiveness monitoring unit.

7. The method of claim 5, wherein the lane return situation is determined if at least one of the following conditions is met:

the distance with respect to time of two points of intersection in relation to one another is less than a predetermined time threshold;

the spatial-geometric spacing of two points of intersection in relation to one another is less than a predetermined spacing threshold;

the maximum lateral spacing of the driving trajectory and the lane trajectory between two points of intersection is less than a predetermined distance;

the distance with respect to time or the spatial-geometric distance of the vehicle to the first point of intersection is less than a predetermined distance threshold; and the lane type of the presently travelled lane and/or the lane to be travelled after crossing the first point of intersection is of a predetermined group of defined permissible lane types.

8. The method of claim 1, further comprising:

evaluating a result of a driver attentiveness monitoring unit; and emitting the signal independently of the determination if the result of the driver attentiveness monitoring unit does not identify an attentive driver.

9. A system for assisting a driver of a vehicle in maintaining a lane, comprising:

a first detection unit configured to detect driving state measurement signals of a vehicle;

a first ascertainment unit configured to ascertain a driving trajectory of the vehicle based on the detected driving state measurement signals;

a second detection unit configured to detect surroundings information signals of the vehicle;

a second ascertainment unit configured to ascertain a lane trajectory of the lane, based on the surroundings information signals;

a third ascertainment unit configured to ascertain points of intersection of the driving trajectory with the lane trajectory;

a determination unit configured to determine, based on at least the number of ascertained points of intersection: (a) whether a lane departure situation is present, and (b) whether a lane return situation is also present;

an emission unit configured to emit a signal to effectuate an assistance of the driver in maintaining the lane based on the determination.

* * * * *